United States Patent [19]

Morse et al.

[11] 3,821,422

[45] June 28, 1974

[54] DEVIL'S FOOD CAKE AND OTHER ALKALINE BAKERY GOODS

[75] Inventors: Lewis D. Morse, Princeton; Paul A. Hammes, Westfield; William A. Boyd, Plainfield, all of N.J.

[73] Assignee: Merk & Co., Inc., Rahway, N.J.

[22] Filed: Mar. 4, 1971

[21] Appl. No.: 121,121

[52] U.S. Cl.................... 426/72, 426/155, 426/496
[51] Int. Cl.............................................. A23l 1/30
[58] Field of Search............ 99/92, 93, 90 S, 90 HP, 99/94, 2 V, 11; 252/316; 425/255, 35

[56] References Cited
UNITED STATES PATENTS

| | | | |
|---|---|---|---|
| 1,431,525 | 10/1922 | Hoffman | 99/90 HP |
| 2,444,215 | 6/1948 | Whiteside et al. | 99/11 |
| 2,828,206 | 3/1958 | Rosenberg | 424/35 X |
| 2,912,332 | 11/1959 | Young et al. | 99/11 |
| 3,080,292 | 3/1963 | Koff | 424/255 |
| 3,297,806 | 1/1967 | Battista et al. | 99/11 X |
| 3,497,589 | 2/1970 | Borenstein et al. | 424/255 |

FOREIGN PATENTS OR APPLICATIONS

| | | | |
|---|---|---|---|
| 680,861 | 2/1964 | Canada | 252/316 |
| 731,583 | 4/1966 | Canada | 252/316 |

*Primary Examiner*—Raymond N. Jones
*Attorney, Agent, or Firm*—Harry E. Westlake, Jr.; John Frederick Gerkens; Frank M. Mahon

[57] ABSTRACT

The deteriorating action on thiamine of neutral or alkaline conditions in dough batter for, e.g. devil's food cake, is overcome by using thiamine which is microencapsulated in a continuous ethylcellulose coating.

4 Claims, No Drawings

DEVIL'S FOOD CAKE AND OTHER ALKALINE BAKERY GOODS

This invention relates to the thiamine enrichment of bakery goods which have a neutral or alkaline pH, as illustrated, for example by devil's food cake.

Thiamine is an important vitamin as an insufficient human consumption of it manifests itself by such symptoms as a neurasthenic syndrome, peripheral neuropathy, congestive heart failure and even a sudden circulatory collapse. The recommended adult daily dosage is about 0.8 to 1.2 milligrams. To assist persons in assimulating this daily amount, it is a common practice to assimilating the vitamin to bakery goods such as breads and buns.

However, it has been found to be nearly useless to add thiamine to doughs or batters having a neutral or alkaline pH as the vitamin is destroyed; the rate of the destruction is increased when the temperature is elevated during the baking process. Thus, even if it is added in a large overage to the batter for devil's food cake, the amount of the vitamin remaining in the baked cake is negligible or zero. Other representative high alkaline bakery products are soda crackers and ginger snaps and those bakery doughs to which a relatively large amount of sodium bicarbonate or other alkaline salts have been added.

As thiamine is quite unstable, the invention intends that its stable salts such as the hydrochloride, mononitrate, and phosphoric acid ester chloride be used. As their molecular weights are sufficiently close to each other they are interchangeable approximately on a weight for weight basis especially in view of the latitude in the daily human dose. The word thiamine is used in a generic sense herein for these stable salts.

To overcome the degrading effect of a neutral or alkaline condition the invention involves the enrobing of the thiamine granules within a seamless continuous coating of ethylcellulose. It has been found that this protects the thiamine in the make-up of the dough or batter, at the elevated processing temperature and in the final baked product. Moreover, the thiamine is released in the digestive juices of the person's gastrointestinal tract. This is due to diffusion of gastric fluid into the capsules and gradual leaching out of the resultant thiamine solution. Microencapsulation of the thiamine employs the known arts of polymer/polymer incompatibility coacervation, and film formation from solutions by loss of solvent, as embodied in the British Pat. Nos. 965,070, 1,012,658 and 1,016,839 and U.S. Pat. No. 3,155,590. The advantages and good points of the invention, to recapitulate, are:

1. Thiamine can be included in baked goods at neutral or alkaline pH.
2. Thiamine is taste masked.
3. There is no need for unusually large overages with accompanying expense and taste problems.
4. All this is accomplished without sacrificing nutritional availability of the thiamine.

The following examples illustrate the invention:

EXAMPLE 1

The following were dispersed in 800 ml. cyclohexane, using an upthrust turbine impellor:

12 gm. Ethylcellulose (47.5 percent ethoxyl content by weight; viscosity 100 cps. as 5 percent solution in 80:20 toluene:ethanol at 25° C).

6 gm. Polyethylene granules (molecular weight about 7000).

110 Gm. Thiamine mononitrate (30–80 mesh).

Stir the system with heating, at 240 rpm. At 80° C. both the ethylcellulose and the polyethylene had dissolved in the cyclohexane.

Stirring was continued while the system was allowed to cool. As the temperature dropped, solvated ethylcellulose developed as a separate phase due to the presence of the polyethylene. This is a known art, described in the literature as an example of coacervation resulting from polymer/polymer incompatibility. The solvated ethylcellulose distributed in the cyclohexane as droplets by the turbine, tended to wet individual granules of vitamin and to envelop them. As the temperature dropped further, the ethylcellulose lost solvent and developed into solid encapsulating walls. The continuous phase, cyclohexane, contained minute particles of polyethylene. At 45° C. the walls had stopped building up and 400 ml. cold cyclohexane was added to reduce the temperature still further. The supernatant cyclohexane was poured off together with the minute particles of polyethylene. The microcapsules were resuspended in 400 ml. clean cyclohexane. This was continued until the capsules were washed clean of polyethylene and other debris. The capsules were spread to dry. The resultant microcapsules with a 90 percent vitamin content, when screened through standard Taylor sieves, had the following size distribution (wt. percent).

| | |
|---|---|
| +10 mesh | Trace |
| −10/+20 | 5.2 |
| −20/+40 | 44.5 |
| −40/+80 | 48.5 |
| −80/+100 | 0.9 |
| −100 | 0.9 |

Uncoated thiamine is bitter. Laboratory personnal found no bitter taste when they put several microcapsulses on the tongue and swallowed them.

The −20/+40 fraction of these capulses were dispersed in simulated gastric fluid at 100 mg. thiamine mononitrate to 70 ml. fluid. At 38° C with shaking, the microcapsules released internal thiamine as follows:

| Time (min.) | Release of thiamine (% based on total weights of internal phase). |
|---|---|
| 15 | 92.24 |
| 30 | 92.86 |
| 45 | 93.88 |
| 60 | 81.22 |
| 90 | 96.94 |
| 120 | 96.33 |

EXAMPLE II

Capsules were prepared successfully as in Example I, but the amount of ethylcellulose was increased to 24 gm. The resultant capsules, with an 82 percent vitamin content when screened through standard Taylor sieves, had the following size distribution (wt. percent).

| | |
|---|---|
| +10 mesh | 3.9 |
| −10/+20 | 37.3 |
| −20/+40 | 38.5 |
| −40/+80 | 19.5 |
| −80/+100 | 0.4 |
| −100 | 0.4 |

Release rates of the −20/+40 fraction in simulated gastric juice under the conditions of Example I were

| Time (min.) | Release of thiamine (% based on total wt. of i.p.) |
|---|---|
| 30 | 71.8 |
| 45 | 77.96 |
| 60 | 94.90 |

EXAMPLE III

Capsules were prepared successfully as in Example I, but the amount of thiamine mononitrate was reduced to 55 gm. The resultant microcapsules with an 82 percent vitamin content, when screened through standard Taylor sieves, had the following size distribution (wt. percent).

| | |
|---|---|
| +10 mesh | Trace |
| −10/+20 | 3.2 |
| −20/+40 | 58.4 |
| −40/+80 | 35.2 |
| −80/+100 | 1.6 |
| −100 | 1.6 |

EXAMPLE IV

Capsules were prepared successfully as in Example I, but employing the following quantities of materials:
500 ml. cyclohexane
180 gm. ethylcellulose
45 gm. polyethylene
775 gm. thiamine mononitrate
This was stirred at 775 rpm, quenched with 1 liter cyclohexane, and washed 3 times with 2 liters cyclohexane each wash.

EXAMPLE V

Capsules were prepared successfully as in Example I, but employing the following quantities of materials:
18.75 liters cyclohexane
675 gm. ethylcellulose
169 gm. polyethylene
2910 gm. thiamine mononitrate
This was stirred at 2,170 rpm, quenched with 3.75 liter cyclohexane; and washed 3 times with 5 liter of cyclohexane each wash. The resultant capsules had the following mesh distribution (wt. percent).

| | |
|---|---|
| +12 mesh | 0.4 |
| −12/+16 | 2.4 |
| −16/+20 | 9.3 |
| −20/+30 | 19.3 |
| −30/+40 | 28.2 |
| −40/+60 | 30.7 |
| −60/+80 | 5.7 |
| −80/+100 | 2.2 |
| −100/+140 | 1.1 |
| −140/+200 | 0.3 |
| −200/+325 | 0.1 |
| −325 | 0.0 |

Dispersed in simulated gastric fluid as in Example I, the −20/+60 fraction had a release rate of:

| Time (min.) | Release of thiamine (% based on total wt.i.p.) |
|---|---|
| 15 | 97.2 |
| 30 | 101.0 |
| 45 | 98.5 |
| 60 | 98.5 |

The following examples show the results of using the preceding coated thiamine and ordinary uncoated thiamine in various neutral or alkaline bakery goods. The results are summarized in Table I.

EXAMPLE VI

Devil's Food Cake was prepared, using a commercially available cake mix (Duncan Hines Deluxe Cake Mix).

The recipe on the package reads:

"Preheat oven to 350°. Generously grease (about one-half tablespoon each pan) and then flour pans.

In a large bowl combine mix, 1 ½ cups of water and 2 eggs; blend until moistened. Scrape bowl and beaters. Beat 2 minutes at medium speed. If hand mixing, beat vigorously 300 strokes.

Bake at 350° until done. Cake is done if center springs back when touched lightly with finger."

This procedure was followed except that just prior to the bearing stage there was added uncoated 11.2 mg. thiamine mononitrate/lb. The pH of the batter was 8.0. The batter was poured into coded cupcakes for this example and all of the experimental work reported here.

Finished cakes of this example were found to have 0.76 mg. thiamine/lb. finished cake. There was a vitamin aftertaste and odor as would be expected because of the uncoated and degraded condition of the thiamine.

EXAMPLE VII

Cakes were prepared as in Example VI, but 2.70 mg. of the −20/+40 fraction of microcapsules of Example I were added per lb. of batter as in Example VI. This provided 2.44 mg. thiamine mononitrate.

Finished cake was found to have 1.03 mg. thiamine/lb. There was no vitamin aftertaste or odor.

EXAMPLE VIII

This preparation was according to Example VII but with 3.52 mg. microcapsules of Example III/lb. of batter. This provided 2.90 mg. thiamine mononitrate. The finished cakes had 1.96 thiamine/lb. of cake and had no vitamin aftertaste or odor.

EXAMPLE IX

Devil's Food Cake was prepared as follows:
Blend to smooth mix at medium speed for 5 minutes:

| | | |
|---|---|---|
| Sugar | 3 lbs. | 6 oz. |
| Salt | | 1 oz. |
| Milk powder (skim) | | 5 oz. |
| Cocoa (natural) | | 9 oz. |
| Cake flour | 3 lbs. | |
| Emulsified shortening | 1 lb. | 4 oz. |
| Dissolve in 1 lb., 1 oz. water | | |
| Baking soda | | ¾ oz. |
| Eggs | 1 lb. | 8 oz. | added in 3 stages scraping the kettle after each addition.

Add 1 ½ oz. baking powder and 1 ox. vanilla with the last of the eggs. Blend well for 5 minutes. Bake as cupcakes at 355°F.

The resultant cakes were found to have less than 0.3 mg. thiamine/lb. cake and this was the residue of the thiamine present in the commercial flour. No aftertaste or odor was noticeable.

EXAMPLE X

Cakes were baked as in Example IX but adding 10.67 mg./lb. uncoated thiamine mononitrate to the batter just before baking.

Found 1.71 mg. thiamine/lb. in the finished cake. A bitter aftertaste and thiamine odor was apparent.

EXAMPLE XI

Cakes were baked as in Example IX, but adding 11.85 mg/lb. of the −20/+40 fraction of capsular form of Example I. This provided 10.66 mg. thiamine mononitrate/lb. batter.

Found 9.85 mg. thiamine/lb. in the finished cake. No thiamine aftertaste or odor was noticeable.

EXAMPLE XII

Cakes were baked as in Example IX, but adding 13.05 mg. of the microcapsules of Example III. This provided 10.70 mg. thiamine mononitrate/lb. batter.

Found 10.18 mg./lb. thiamine in the finished cake. No thiamine aftertaste or odor was apparent.

EXAMPLE XIII

Cakes were baked as in Example IX, but adding 2.09 mg. uncoated thiamine mononitrate/lb. batter.

Found 0.289 mg./lb. in the finished cake. A bitter aftertaste and thiamine odor was apparent.

EXAMPLE XIV

Cakes were baked as in Example IX, but adding 2.32 gm. −20/+40 fraction of capsules from Example 1. This provided 2.09 mg. thiamine mononitrate/lb. batter.

1.27 mg./lb. Finished cake of thiamine were found. No thiamine aftertaste or odor was apparent.

EXAMPLE XV

Cakes were baked as in Example IX but 2.88 mg. −20/+40 fraction of capsules from Example III was used. This provided 2.36 mg. thiamine mononitrate/lb. batter.

1.81 mg./lb. Thiamine were found in the finished cake. No thiamine aftertaste or odor was apparent.

The data of the above cake tests are summarized as follows:

TABLE I

| Sample Example | Added (mg. thiamine/lb. batter) | Found (mg. thiamine/lb. batter) | % Rec. |
|---|---|---|---|
| VI | 11.2 | 0.76 | 6.75 |
| VII | 2.44 | 1.03 | 42.2 |
| VIII | 2.90 | 1.96 | 67.2 |
| IX | (none added) | 0.3 | |
| X | 10.67 | 1.71 | 16.0 |
| XI | 10.66 | 9.85 | 92.4 |
| XII | 10.70 | 10.18 | 95.17 |
| XIII | 2.09 | 0.289 | 13.8 |
| XIV | 2.09 | 1.27 | 60.8 |
| XV | 2.36 | 1.81 | 76.9 |

Other illustrations of neutral or alkaline bakery products are the following:

EXAMPLE XVI

Soda crackers can be prepared using standard practices using the recipe.

| Sponge Ingredients | Lb. |
|---|---|
| Flour | 70 |
| Yeast | 0.23 |
| Water | 30 |
| Shortening | 4 |
| Diastatic malt | 0.02 |
| Sponge Time | 18 hours |
| Dough Ingredients, | Lb. |
| Flour | 30 |
| Shortening | 5.8 |
| Salt | 1.4 |
| Sodium bicarbonate | 0.63 |
| Malt syrup | 0.92 |
| Water | 0.8 |
| Totals | |
| Flour | 100 |
| Yeast | 0.23 |
| Water | 31 |
| Shortening | 9.5 |
| Malt | 0.02 |
| Malt syrup | 0.92 |
| Salt | 1.4 |
| Sodium bicarbonate | 0.63 |
| Fermentation | |
| Time, | 4 hours |
| Temperature, | 82°F. |

The pH of the batter would be about 8.

Adding 0.145 gm. ordinary thiamine mononitrate to the dough just before baking would be expected to result in a 5–10 percent recovery of thiamine mononitrate in the finished goods.

EXAMPLE XVII

Soda crackers prepared as in Example XVI, but to which is added 161 mg. of the −20/+40 fraction of microcapsules from Example I would be expected to show a 65–75 percent recovery of thiamine.

EXAMPLE XVIII

Example XVII is followed but −20/+40 microcapsules from Example III would be added and this would be expected to show an 80–90 percent recovery of the thiamine.

EXAMPLE XIX

Cookies can be prepared according to standard practices with the following recipe:

| Ingredient | Ginger Snap Lb. |
|---|---|
| Soft flour | 100 |
| Sugar | 12 |
| Invert sugar syrup | 38[1] |
| Shortening | 15 |
| Salt | 1 |
| Malt | 5 |
| Sodium bicarbonate | 2 |
| Water | 8 |
| Flavor | 2[2] |

[1] Molasses
[2] Usually about 3 parts ginger to 1 part cinnamon

The pH of the batter is about 9.

Adding 183 mg. ordinary thiamine mononitrate to the batter just before baking would be expected to lead to baked goods in which 5–10 percent of the thiamine would be recovered.

EXAMPLE XX

This recipe of Example XIX, is followed with the addition of 204 mg. of the microcapsules of Example I. This would be expected to give a 60–77 percent recovery of thiamine.

EXAMPLE XXI

Example XIX, followed with the addition of 228.7 mg. of the microcapsules of Example III, would be expected to give an 80–95 percent recovery of thiamine.

In any of the above examples, instead of using thiamine mononitrate, the other nutritionally available, stable salts mentioned above may be substituted on substantially a weight for weight basis.

EXAMPLE XXII

The thiamine microcapsules could be included in a premix which is especially intended for addition to a batter or dough which is neutral or alkaline. A representative formula is:

| Ingredient | Range | Preferred Amount |
|---|---|---|
| Starch, corn or wheat | 0 to 150 kg. | 76.0 kg. |
| Riboflavin | 0 to 0.50 kg. | 0.25 kg. |
| Iron (as elemental iron) | 0 to 6.0 kg. | 3.00 kg. |
| Niacin | 0 to 10.0 kg. | 4.00 kg. |
| Thiamine, microencapsulated | 0.7131 kg. | 0.7131 kg. |

This Example XXII is illustrative of the premix compositions which are another feature of the invention. These premixes can contain the microcapsules of any one of the Examples I to IV instead of those of Example V. The premix may have any nutritional iron salt, reduced iron, or vitamin salts instead of the ones named and such compositions are obvious variations of the above formula. The premix can of course be added to batters having an acid pH.

EXAMPLE XXIII

The premix of Example XXII was included in cakes baked as in Example VI using enough of the premix to supply 5.1 mg. of thiamine mononitrate per lb. of the batter. This premix was added to the batter just before baking.

The finished cakes contained 2.5 mg./thiamine mononitrate/lb. baked cake.

What is claimed is:

1. A thiamine enriched bakery product made from a dough or batter having a neutral or alkaline pH, said thiamine being present microencapsulated in a continuous ethylcellulose coating in an amount of at least 1 mg per lb of baked product.

2. The thiamine enriched bakery product of claim 1 which is devil's food cake.

3. The bakery product of claim 1 which is a cookie or cracker.

4. The method of making a thiamine enriched bakery product from a dough batter having a neutral or alkaline pH which comprises adding to said batter thiamine microencapsulated in a continuous ethylcellulose coating in an amount sufficient to enrich said batter with thiamine, shaping the batter into forms for baking, and baking the formed batter.

* * * * *

UNITED STATES PATENT OFFICE
CERTIFICATE OF CORRECTION

Patent No. 3 821 422    Dated June 28, 1974

Inventor(s) MORSE, HAMMES & BOYD

It is certified that error appears in the above-identified patent and that said Letters Patent are hereby corrected as shown below:

On the title page:

[73] Assignee: Merk & Co., Inc., Rahway, N. J.

should read

[73] Assignee: Merck & Co,, Inc., Rahway, N. J.

Signed and sealed thi 29th day of October 1974.

(SEAL)
Attest:

McCOY M. GIBSON JR.
Attesting Officer

C. MARSHALL DANN
Commissioner of Patents